(12) United States Patent
Francom et al.

(10) Patent No.: US 9,990,323 B2
(45) Date of Patent: Jun. 5, 2018

(54) CONFIGURING A COMMUNICATION INTERCONNECT FOR ELECTRONIC DEVICES

(71) Applicant: HEWLETT-PACKARD DEVELOPMENT COMPANY, L.P., Houston, TX (US)

(72) Inventors: Jared Kimball Francom, Cypress, TX (US); Chanh V. Hua, Houston, TX (US); Sze Hau Loh, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 209 days.

(21) Appl. No.: 14/902,513

(22) PCT Filed: Jul. 31, 2013

(86) PCT No.: PCT/US2013/052870
§ 371 (c)(1),
(2) Date: Dec. 31, 2015

(87) PCT Pub. No.: WO2015/016862
PCT Pub. Date: Feb. 5, 2015

(65) Prior Publication Data
US 2016/0147696 A1    May 26, 2016

(51) Int. Cl.
*G06F 13/20* (2006.01)
*G06F 15/16* (2006.01)
(Continued)

(52) U.S. Cl.
CPC ...... *G06F 13/4027* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 6,072,803 A    6/2000  Allmond et al.
6,260,092 B1   7/2001  Story et al.
(Continued)

FOREIGN PATENT DOCUMENTS

CN    1896983 C      1/2007
CN    101277195 B   12/2011
(Continued)

OTHER PUBLICATIONS

International Searching Authority, The International Search Report and the Written Opinion, PCT/US2013/052870, dated Apr. 25, 2014, 10 Pages.
(Continued)

*Primary Examiner* — Hyun Nam
(74) *Attorney, Agent, or Firm* — Trop, Pruner & Hu, P.C.

(57) ABSTRACT

Logic determines a connection arrangement for communication between electronic devices over a communication interconnect. A first group of signals of the communication interconnect is enabled in response to determining that a first connection arrangement is to be used. A second, different group of signals of the communication interconnect is enabled in response to determining that a second, different connection arrangement is to be used.

20 Claims, 4 Drawing Sheets

(51) Int. Cl.
 G06F 13/40 (2006.01)
 G06F 13/42 (2006.01)

(56) References Cited

U.S. PATENT DOCUMENTS

| | | |
|---|---|---|
| 6,885,670 B1 | 4/2005 | Regula |
| 6,978,334 B2 * | 12/2005 | Hiratsuka ............. G06F 13/385 |
| | | 710/305 |
| 2005/0021890 A1 | 1/2005 | Baker et al. |
| 2008/0195747 A1 * | 8/2008 | Elmaliah ................. H04L 29/06 |
| | | 709/232 |
| 2009/0327543 A1 | 12/2009 | Teggatz et al. |
| 2013/0044588 A1 | 2/2013 | Kogge |
| 2013/0166798 A1 * | 6/2013 | Chandra ............. G06F 13/4022 |
| | | 710/105 |

FOREIGN PATENT DOCUMENTS

| | | |
|---|---|---|
| CN | 102347899 B | 2/2012 |
| TW | 201217983 A | 5/2012 |

OTHER PUBLICATIONS

Nussle, M. et al., An FPGA-based Custom High Performance Interconnection Network, (Research Paper), International Conference on Reconfigurable Computing and FPGAs, Dec. 9-11, 2009, pp. 113-118.

\* cited by examiner

CONFIGURING A COMMUNICATION INTERCONNECT FOR ELECTRONIC DEVICES

BACKGROUND

A system can include electronic devices that are coupled to a communication interconnect to allow for communication between the electronic devices. The electronic devices can be coupled to each other over the communication interconnect using one of various types of communication interfaces. For example, a first type of communication interface is a network interface, such as an Ethernet interface. Another type of communication interface is a bus-based interface, such as a Peripheral Component Interconnect Express (PCIe) bus interface.

BRIEF DESCRIPTION OF THE DRAWINGS

Some implementations are described with respect to the following figures.

DETAILED DESCRIPTION

Figure 1:
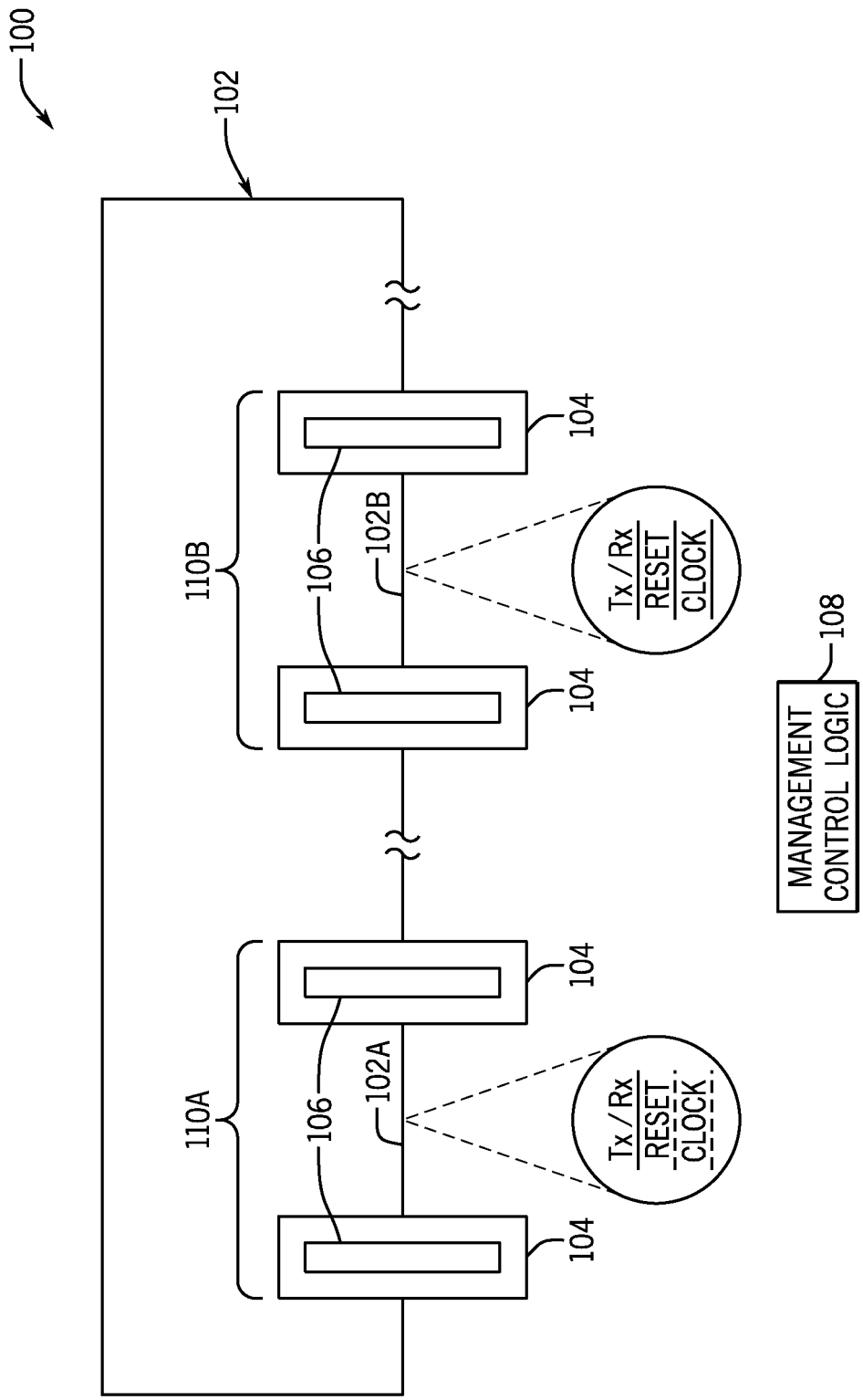
FIG. 1 is a block diagram of an example system according to some implementations.

A communication interconnect can have connection points, such as slots, connectors, or other connection structures, to receive electronic devices. The connection points can allow for electrical, optical, or wireless connections. Examples of electronic devices include computers, storage devices, communication devices, and so forth. The communication interconnect can include communication channels (e.g. electrical wires, optical links, wireless links, and so forth) that allow for the electronic devices connected to the communication interconnect to communicate with each other.

Traditionally, the communication interconnect provides a specific type of communication interface to allow for communications among the electronic devices. For example, electronic devices on the communication interconnect can communicate using a network interface, such as an Ethernet interface. The Ethernet interface allows electronic devices to communicate according to an Ethernet protocol, in which electronic devices exchange data in Ethernet frames having source and destination addresses. The Ethernet interface allows for host-to-host communications, where electronic devices are considered hosts that are able to exchange data with each other without one of the electronic devices using separate control signals (e.g. a clock signal, reset signal, etc.) to control the operation of the other electronic device. In host-to-host communications, control signals such as the clock and reset signals are encoded in the transmit signals (also used for carrying data). The encoded clock and reset signals are decoded by a receiving device.

Alternatively, electronic devices on a communication interconnect can communicate using a bus-based interface, such as a Peripheral Component Interconnect Express (PCIe) interface. The PCIe interface allows electronic devices to communicate using the PCIe protocol, which employs host-to-target communications. A host-to-target communication involves a master controlling the communication interconnect when communicating with a target. In some examples, the control is effected by use of a clock signal and a reset signal that are separate from transmit and receive signals for carrying data. The clock signal is produced by the master electronic device to provide synchronization between the master and target electronic devices. A reset signal is issued by the master electronic device to reset circuitry of the target electronic device.

Although reference is made to specific example communication interfaces such as the Ethernet interface and PCIe interface in the present discussion, it is noted that techniques or mechanisms according to some implementations can be applied to other types of communication interfaces.

In some cases, to enhance flexibility and performance, different communication interfaces for use by respective different sets of electronic devices connected to a common communication interconnect. For example, a first set of electronic devices on the communication interconnect can employ a first type of communication interface (e.g. Ethernet interface), while a second set of electronic devices on the communication interconnect can employ a second type of communication interface (e.g. PCIe interface).

Employing different communication interfaces by different sets of electronic devices on the same communication interconnect can lead to some issues if not properly addressed. For example, if a pair of electronic devices on the communication interconnect is configured to use an Ethernet interface, then the presence of separate clock and reset signals may lead to faulty communications. On the other hand, if a pair of electronic devices on the communication interconnect is configured to use a PCIe interface, then the electronic devices may expect that clock and reset signals be present.

In accordance with some implementations, a management control logic is provided to allow for proper configuration of a communication interconnect (and more specifically, for a respective portion of the communication interconnect) for communications between a corresponding set of electronic devices on the communication interconnect. Configuring the communication interconnect portion refers to enabling and/or disabling selected signals of the communication interconnect portion to allow for successful communications between the two or more electronic devices of the set over the communication interconnect portion.

FIG. 1 is a block diagram of an example system 100 that includes a communication interconnect 102. Various slots 104 are provided on the communication interconnect 102, where the slots are able to receive respective electronic devices 106. More generally, the communication interconnect 102 can have connection points to which respective electronic devices 106 can be connected.

In examples according to FIG. 1, the communication interconnect 102 has a ring topology. In the ring topology, one electronic device is connected to the next, adjacent electronic device, which in turn is connected to another adjacent electronic device in succession. The communication interconnect 102 wraps around back from the last slot to the first slot to create a ring.

In other implementations, the communication interconnect 102 can have a different topology, including a non-ring topology. The communication interconnect 102 can be part of a circuit board, backplane, or other structure.

A management control logic 108 is provided for managing the communication interface for each set of the electronic devices 106. The management control logic 108 can be separate from the electronic devices 106, or alternatively, the management control logic 108 can be part of the electronic devices 106, with different portions of the management control logic 108 distributed across the electronic devices 106.

In the example of FIG. 1, two pairs 110A and 110B of electronic devices 106 are identified. The management control logic 108 can configure the communication interface to be used between electronic devices 106 of the first pair 110A, and can independently configure the communication interface to be used for the second pair 110B of electronic devices 106. More generally, instead of managing the communication interfaces for respective pairs of electronic devices 106, the management control logic 108 can configure the communication interfaces used by other sets of electronic devices 106, where a set of electronic devices can include two or more than two electronic devices. Although FIG. 1 shows the two pairs 110A and 110B as having non-overlapping electronic devices, it is noted that in other examples, two pairs of electronic devices can overlap. Also, although FIG. 1 depicts interactions between electronic devices in one direction (horizontal direction in the view of FIG. 1), it is noted that in other examples, interactions can also occur in a different direction, such as a vertical direction (depicted in FIG. 4, for example).

Configuring a communication interface for a set of electronic devices refers to selectively enabling and/or disabling signals of the portion of the communication interconnect 102 used by the set of electronic devices for communications. For example, it is assumed that the first pair 110A of electronic devices 106 are configured to communicate over an Ethernet interface, while the second pair 110B of electronic devices 106 are configured to communicate over a PCIe interface. In such an example, the electronic devices 106 of the first pair 110A would not employ discrete clock and reset signals, but rather, would employ just the transmit and receive signals of the communication interconnect 102. A transmit signal is used by an electronic device to transmit data, while a receive signal is used by the electronic device to receive data. As a result, in a communication interconnect portion 102A between the first pair 110A of electronic devices, the transmit and receive signals (Tx/Rx signals in FIG. 1) are enabled, while the clock signal and reset signal are disabled (as indicated by the dashed lines in the communication interconnect portion 102A).

It is noted that the Tx/Rx signals, clock signal, and reset signal are routed over respective channels (e.g. electrical wires, optical links, wireless links, etc.) of a communication interconnect portion. Enabling a signal can refer to enabling interface circuitry of at least one corresponding electronic device to communicate the signal over the respective channel. Disabling a signal can refer to disabling interface circuitry of at least one corresponding electronic device to prevent communication of the signal over the respective channel.

The electronic devices 106 of the second pair 110B would employ the transmit and receive signals as well as the clock and reset signals of another portion (102B) of the communication interconnect 102. As a result, the management control logic 108 can enable the transmit and receive signals (Tx/Rx signals) and enable the clock and reset signals of the communication interconnect portion 102B (the clock and reset signals are represented as solid lines in the communication interconnect portion 102B) for the second pair 110B of electronic devices.

Figure 2:
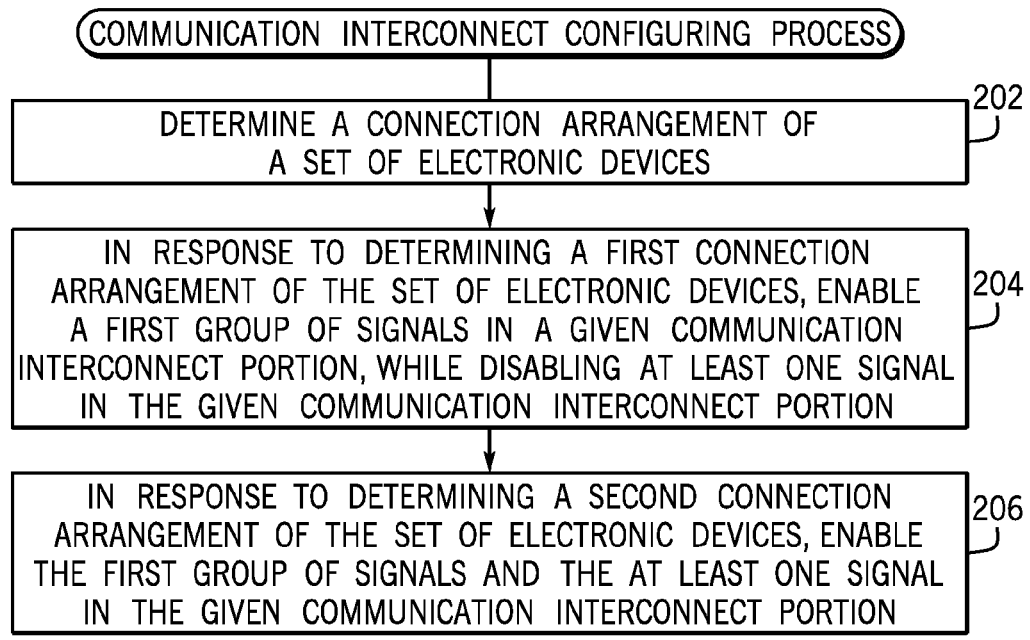
FIG. 2 is a flow diagram of a communication interconnect configuration process according to some implementations.

FIG. 2 is a flow diagram of a communication interconnect configuring process performed by the management control logic 108, according to some implementations. As noted above, the management control logic 108 can be a central control logic separate from the electronic devices 106, or alternatively, the management control logic 108 can be a distributed control logic implemented in the electronic devices 106.

The management control logic 108 determines (at 202) a connection arrangement of a set (e.g. pair) of electronic devices connected to adjacent connection points of the communication interconnect 102. Determining a connection arrangement of a set of electronic devices can include determining the type of communication interface to use for the set of electronic devices, based on a determination of a type of connection used by the electronic devices in the set, and other information. The type of communication interface can include an Ethernet interface, a PCIe interface, or other type of interface.

In response to determining a first connection arrangement of the set of electronic devices, the management control logic 108 enables (at 204) a first group of signals in the respective given portion of the communication interconnect 102, while disabling at least one signal in the given portion of the communication interconnect 102. The enabled first group of signals can include transmit and receive signals, while the disabled at least one signal can include at least one of a clock signal, a reset signal, and so forth.

On the other hand, in response to determining a second connection arrangement of the set of electronic devices, the management control logic 108 enables (at 206) the first group of signals as well as the at least one signal (e.g. the transmit and receive signals as well as at least one of a clock signal, a reset signal, and so forth, are enabled).

More generally, the management control logic 108 enables a first group of signals on the given communication interconnect portion for a set of electronic devices in response to detecting the first connection arrangement, and enables a second, different group of signals on the given communication interconnect portion in response to detecting the second, different connection arrangement.

In some implementations, the determination (at 202) of the connection arrangement can be based on accessing data stored on the electronic devices 106 of a given set of electronic devices. The accessed data can include capability information that describes a connection characteristic (e.g. connection type, type of interface, and so forth) that is used by the electronic device. In implementations where the management control logic 108 is separate from the electronic devices 106, the management control logic 108 can query the electronic devices on the communication interconnect 102 to retrieve the stored data relating to the connection characteristics of the respective electronic devices. Based on the retrieved data, the management control logic 108 is able to determine the connection arrangement to use, and can selectively enable and disable signals of the communication interconnect 102 for the given set of electronic devices 106.

In some examples, the reset and clock signals of a communication interconnect portion will remain disabled, unless explicitly enabled by the management control logic 108 for a set of electronic devices. In other examples, management control logic 108 can selectively enable or disable (such as by use of enable or disable control indications) the reset and clock signals based on the determination of the connection arrangement to use for a set of electronic devices.

In other implementations, instead of using a central management control logic, the management control logic 108 can be distributed across the electronic devices 106. In such latter implementations, at least one channel of the communication interconnect 102 can be used as a management bus to allow for auto-discovery of electronic devices in adjacent connection points of the communication interconnect 102. For example, the at least one channel can be the channel for carrying the reset signal. The channel is thus used for management communications during the auto-discovery phase, and can be used to carry a reset signal during normal operation.

In examples where the auto-discovery management bus is implemented with one channel of the communication interconnect 102, a single-channel bus protocol can be employed to allow for one electronic device to query (over the channel) its adjacent electronic device to determine the connection arrangement that is to be used for the pair of electronic devices. In other examples, instead of using a single channel, multiple channels of the communication interconnect 102 can be used as a multi-channel management bus to allow one electronic device to query an adjacent electronic device.

In some implementations, the protocol used on the management bus can be a protocol in which one of the electronic devices of a pair is the master, while the adjacent electronic device is a slave. During initialization (such as during power up of the electronic devices), the master electronic device queries the target electronic device over the single-channel bus to obtain data relating to a connection characteristic of the target electronic device, as well as other data, such as data relating to a power-up specification of the target electronic device. For example, the power-up specification can indicate whether the target electronic device is to power up first or second in relation to the master electronic device.

In the distributed implementations, the master-slave communications over the single-channel management bus (or multi-channel management bus) can succeed if the adjacent electronic devices employ a host-to-target interface, such as a PCIe interface. However, if the adjacent electronic devices employ a host-to-host interface such as an Ethernet interface, then bus contention will exist on the management bus. If the electronic devices detect bus contention, the electronic devices will back off the communication interconnect 102. In such cases, the clock and reset signals can be disabled at the next power up or at any other time, to allow a host-to-host interface to be used for the pair of electronic devices.

Figure 3:
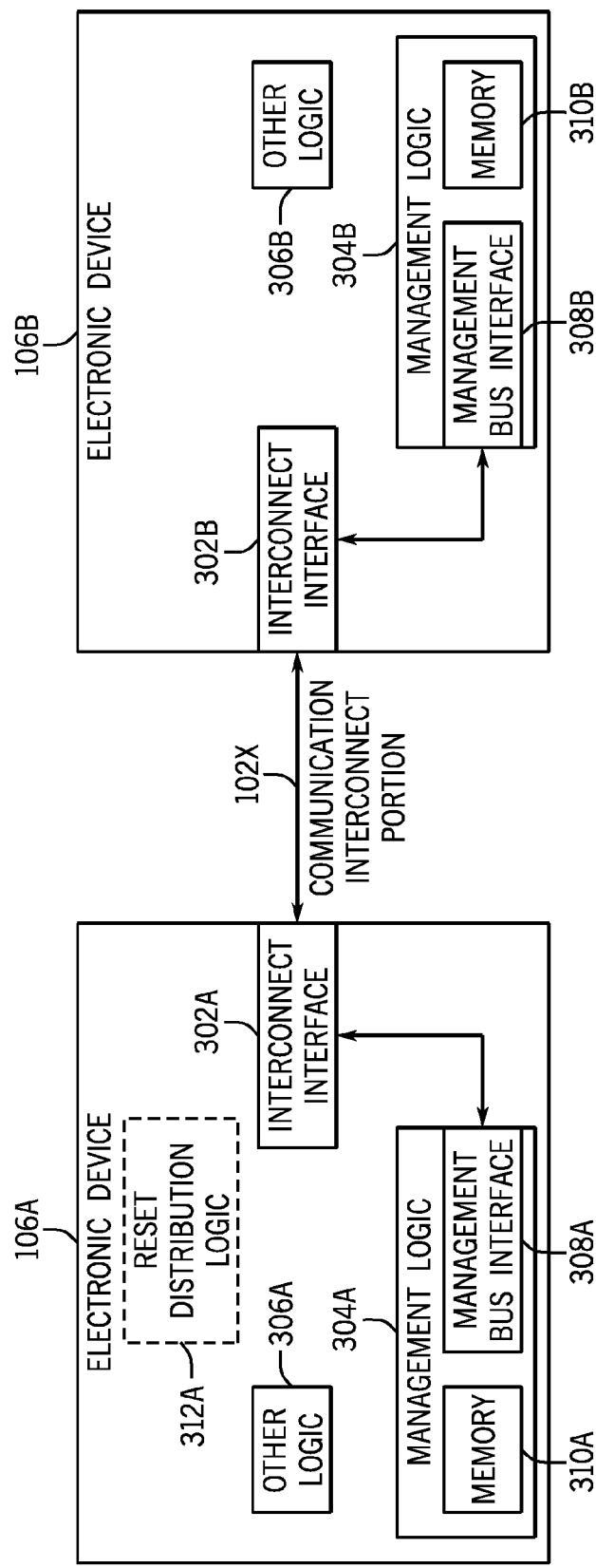
FIG. 3 is a block diagram of components of electronic devices, according to further implementations.

FIG. 3 is a block diagram of an example in which the management control logic 108 (FIG. 1) is distributed across electronic devices 106A and 106B. The distributed management control logic includes management logic 304A in the electronic device 106A, and management logic 304B in the electronic device 106B. Each management logic 304A or 304B can be implemented as a microcontroller, microprocessor, or other type of control circuit.

The electronic device 106A has an interconnect interface 302A for connection to a respective connection point of a communication interconnect portion 102X. The electronic device 106A also includes other logic 306A, which can include one or multiple processors, memory devices, storage devices, input/output (I/O) devices, and so forth.

The management logic 304A includes a management bus interface 308A, which is able to communicate over the management bus (e.g. a single-channel or multi-channel bus as discussed above) with the other electronic device 106B. The management logic 304A also includes a memory 310A for storing data, such as data relating to a connection characteristic of the electronic device 106A, as well as other data.

The electronic device 106B similarly includes an interconnect interface 302B, the management logic 304B, and other logic 306B, arranged in similar fashion as corresponding components in the electronic device 106A. The management logic 304B includes a management bus interface 308B and a memory 310B.

Assuming that the electronic device 106A acts as the master during the auto-discovery phase, the management logic 304A during the auto-discovery phase can send a query over the management bus to retrieve data from the memory 310B in the management logic 304B of the slave electronic device 106B. Assuming that the electronic devices 106A and 106B are configured for host-to-target communications, then the management logic 304B can provide the queried data (in a specified format) back to the management logic 304A, which can make a determination that the communication interface to use is a host-to-target interface (e.g. PCIe interface). For example, the management logic 304A can compare the retrieved data with data relating to a host-to-target interface. In this case, the management logic 304A can cooperate with the management logic 304B to enable the clock and reset signals as well as the transmit and receive signals, by enabling respective interface circuitry in the interconnect interface 302A and 302B.

In some implementations, the target electronic device 106B maintains its interconnect interface (except for the management bus interface circuitry) disabled until enabled by the management logic 304B.

However, if the management logic 304A and 304B determine that bus contention is present on the management bus, then the management logic 304A and 304B can make a determination that a host-to-host interface is to be used between the electronic devices 106A and 106B, in which case the clock and reset signals can be disabled.

After the auto-discovery phase is completed, runtime management of the communication interconnect portion 102X. If a host-to-host interface is configured for the communication interconnect portion 102X, then procedures according to the network protocol (e.g. Ethernet protocol) can be followed to perform the runtime management. If a host-to-target interface is configured for the communication interconnect portion 102X, then the channel(s) used for the management bus can be switched over to its (their) runtime role(s), e.g. reset signal, clock signal, etc.

Before a master-slave interaction can occur as described above, the relationship (including the timing relationship of signals) between the two adjacent electronic devices is first established. The Rx signal of the first electronic device connects to Tx signal of the second electronic device, while the Tx signal of the second electronic device connects to Rx signal of the first electronic device. Note that the foregoing is true of both host-to-host and master-slave communications.

The clock signal is not used in host-to-host communications; as a result, interface circuitry in the pair of electronic devices for the clock signal are disabled. However, for master-slave communications, the interface circuitry in the master for the clock signal is configured to behave as a clock buffer or clock generator, while the interface circuitry in the slave for the clock signal is configured to behave as a clock receiver.

The reset signal is also not used in host-to-host communications; as a result, interface circuitry in the pair of electronic devices for the clock signal are disabled. For master-slave communications, the two electronic devices are arbitrated to be either be a master or a slave, respectively. Once the relationship has been established, the master device controls the data flow of the interface and is able to transfer a reset pulse on the reset signal, as well as issue other instructions to the slave device.

In alternative implementations, each electronic device 106 can include multiple processors. There can be a xN (N>1) interconnect between electronic devices, where N groups of transmit/receive signals are provided to allow N processors in one electronic device to communicate with corresponding N processor in the other electronic device. However, a restriction on pin count of an electronic device may lead to the presence of just a single reset signal and a single clock signal on the electronic device 106.

To address the foregoing issue when a host-to-target interface is configured between a pair of electronic devices, the single reset channel can be used by the host electronic device to provide multiple signals in the target electronic device. A reset distribution logic (e.g. 312A in FIG. 3) of the host electronic device (e.g. 106A in FIG. 3) can provide a control information stream over the single reset channel, where the control information stream carries multiplexed reset (or other type of) control packets each corresponding to a respective separate processor in the target electronic device. For example, a first reset control packet can be decoded by the target electronic device to provide a first reset signal, a second reset control packet can be decoded by the target electronic device to provide a second reset signal, and so forth.

Note that use of the single reset channel for providing multiple reset signals at the target electronic device can be independent of whether or not the single reset channel is used as a management bus for auto-discovery purposes.

Figure 4:
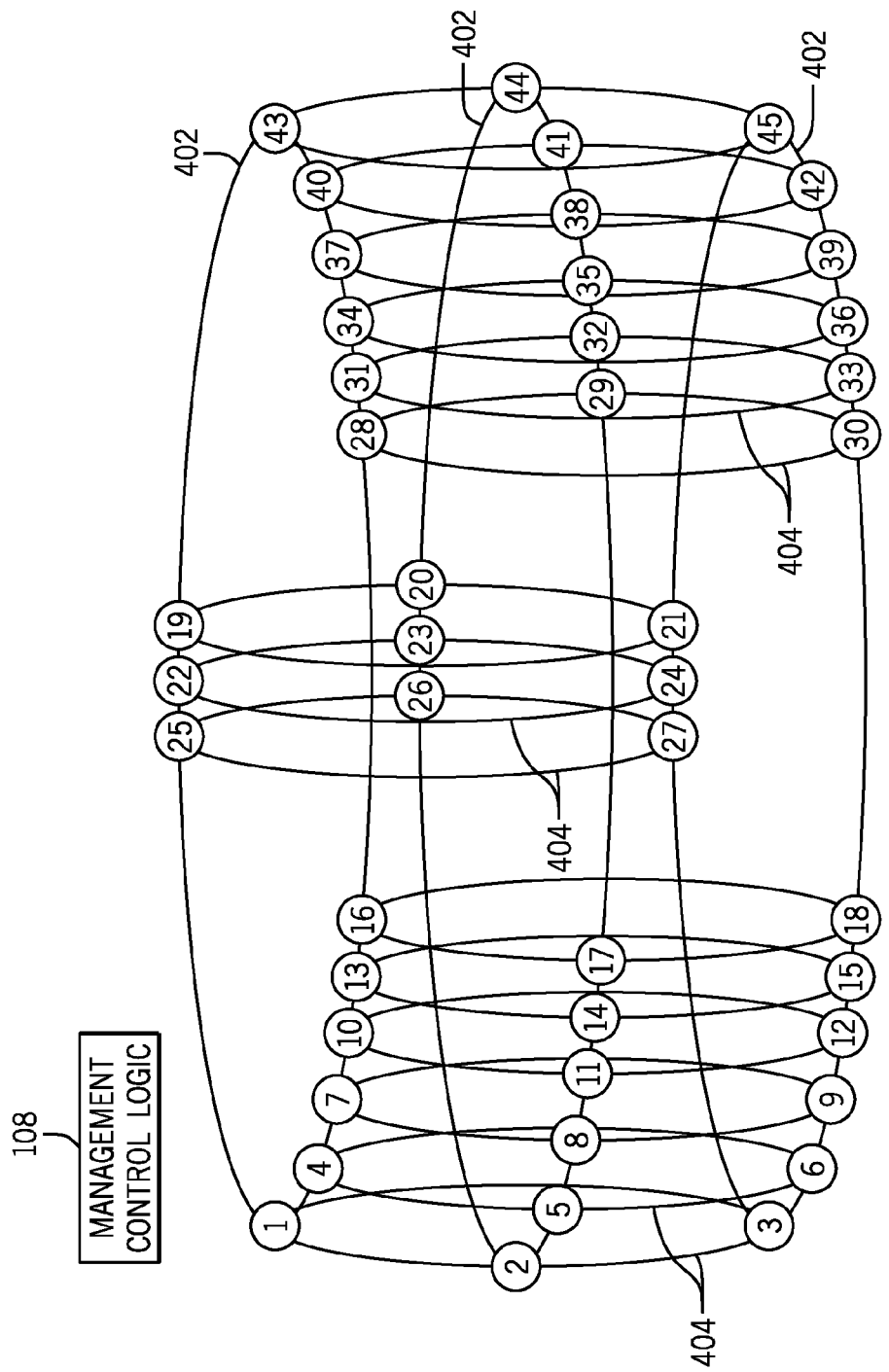
FIG. 4 is a block diagram of an example system according to alternative implementations.

As discussed above, FIG. 1 depicts a communication interconnect 102 that has a ring topology in one direction. FIG. 4 is a schematic diagram of a communication interconnect 400 that has ring topologies in multiple directions (the communication interconnect 400 is an example of a communication interconnect having a Torus ring topology). For example, the communication interconnect 400 includes three horizontal rings 402, and multiple vertical rings 404. Each round circle in FIG. 4 represents an electronic device connected to the respective connection point of the communication interconnect.

Note that interactions can occur between electronic devices in either logical adjacent slots or physical adjacent slots. For example, in FIG. 4, interaction can occur between electronic devices in physically adjacent slots 1 and 4, or slots 4 and 7, and so forth.

Alternatively, interaction can occur between electronic devices in logically adjacent slots 16 and 28, or slots 1 and 25, or slots 19 and 43, and so forth.

The management control logic 108 as discussed above can also be used in the system of FIG. 4, for configuring communication interconnect portions to use the appropriate communication interfaces between sets of electronic devices as discussed above.

The management control logic 108 of FIG. 1 or 4 can be implemented with hardware, or as a combination of hardware and machine-readable instructions. The machine-readable instructions can be loaded for execution on a processor. A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a communication interconnect having a plurality of connection points to connect to corresponding electronic devices; and
control logic to configure the communication interconnect for a set of electronic devices in adjacent connection points of the communication interconnect, the configuring comprising:
enabling a first group of signals on the communication interconnect in response to detecting a first connection arrangement of the set of electronic devices, and
enabling a second, different group of signals on the communication interconnect in response to detecting a second, different connection arrangement of the set of electronic devices, wherein the second group of signals includes a signal that is enabled by the control logic in response to detecting the second connection arrangement, and wherein the control logic is to disable the signal in response to detecting the first connection arrangement.

2. The system of claim 1, wherein the control logic is separate from the electronic devices.

3. The system of claim 1, wherein the control logic is distributed across the electronic devices in the set.

4. The system of claim 1, wherein the communication interconnect has a ring topology.

5. The system of claim 1, wherein the control logic is to access data stored in the set of electronic devices, the accessed data relating to a connection characteristic of each of the electronic devices in the set.

6. The system of claim 1, wherein the control logic includes a first control logic portion in a first of the electronic devices in the set, and a second control logic portion in a second of the electronic devices in the set, and wherein the first control logic portion is to:
send a request for information over a bus to the second control logic portion, the bus including at least one signal of the communication interconnect; and receive a response to the request for information from the second control logic portion, the response including data relating to a connection characteristic of the second electronic device.

7. The system of claim 6, wherein the at least one signal of the bus is part of the second group of signals enabled in response to detecting the second connection arrangement.

8. The system of claim 7, wherein the at least one signal includes a reset signal for resetting circuitry in an electronic device.

9. The system of claim 1, wherein the second group of signals includes a reset signal and a clock signal that are not part of the first group of signals.

10. A method of configuring a communication interconnect for a set of electronic devices, comprising:
   determining, by control logic, a connection arrangement of the set of electronic devices connected to adjacent connection points of the communication interconnect;
   in response to determining a first connection arrangement of the set of electronic devices, enabling, by the control logic, a first group of signals of the communication interconnect, and disabling at least one signal of the communication interconnect; and
   in response to determining a second connection arrangement of the set of electronic devices, enabling, by the control logic, the first group of signals and the at least one signal.

11. The method of claim 10, wherein the at least one signal comprises at least one selected from among a reset signal and a clock signal.

12. The method of claim 10, wherein the first group of signals includes transmit and receive signals for transmitting and receiving data.

13. The method of claim 10, wherein each of the electronic devices in the set includes a plurality of processors, the method further comprising:
   communicating, over a channel of the communication interconnect, a stream of multiplexed control packets that cause generation of a plurality of control signals in one of the electronic devices in the set.

14. An electronic device comprising:
   an interconnect interface to communicate over a communication interconnect with a second electronic device;
   a control logic to configure the communication interconnect for the electronic devices by:
      determining a connection arrangement for communication between the electronic devices over the communication interconnect;
      causing enabling of a first group of signals of the communication interconnect in response to determining that a first connection arrangement is to be used; and
      causing enabling of a second, different group of signals of the communication interconnect in response to determining that a second, different connection arrangement is to be used, wherein the second group of signals includes a signal that is enabled by the control logic in response to detecting the second connection arrangement, and wherein the control logic is to disable the signal in response to detecting the first connection arrangement.

15. A system comprising:
   a communication interconnect having a plurality of connection points to connect to corresponding electronic devices, wherein the communication interconnect has a ring topology; and
   control logic to configure the communication interconnect for a set of electronic devices in adjacent connection points of the communication interconnect, the configuring comprising:
      enabling a first group of signals on the communication interconnect in response to detecting a first connection arrangement of the set of electronic devices, and
      enabling a second, different group of signals on the communication interconnect in response to detecting a second, different connection arrangement of the set of electronic devices.

16. A system comprising:
   a communication interconnect having a plurality of connection points to connect to corresponding electronic devices; and
   control logic to configure the communication interconnect for a set of electronic devices in adjacent connection points of the communication interconnect, the configuring comprising:
      enabling a first group of signals on the communication interconnect in response to detecting a first connection arrangement of the set of electronic devices, and
      enabling a second, different group of signals on the communication interconnect in response to detecting a second, different connection arrangement of the set of electronic devices,
   wherein the control logic includes a first control logic portion in a first of the electronic devices in the set, and a second control logic portion in a second of the electronic devices in the set, and wherein the first control logic portion is to:
      send a request for information over a bus to the second control logic portion, the bus including a signal of the communication interconnect; and
      receive a response to the request for information from the second control logic portion, the response including data relating to a connection characteristic of the second electronic device.

17. The system of claim 16, wherein the communication interconnect has a ring topology.

18. The system of claim 17, wherein the control logic is to access data stored in the set of electronic devices relating to a power-up specification of the set of electronic devices.

19. The system of claim 16, wherein the connection characteristic includes a connection type, an interface type, or any combination thereof.

20. The system of claim 16, wherein the signal of the bus is part of the second group of signals enabled in response to detecting the second connection arrangement.

* * * * *